Nov. 17, 1959          AN WANG          2,913,664
                    FREQUENCY METERS
Filed Jan. 11. 1955                    2 Sheets-Sheet 1
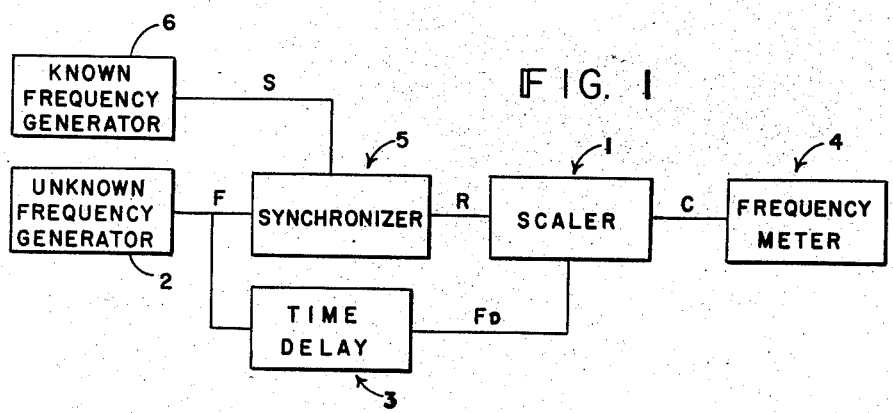
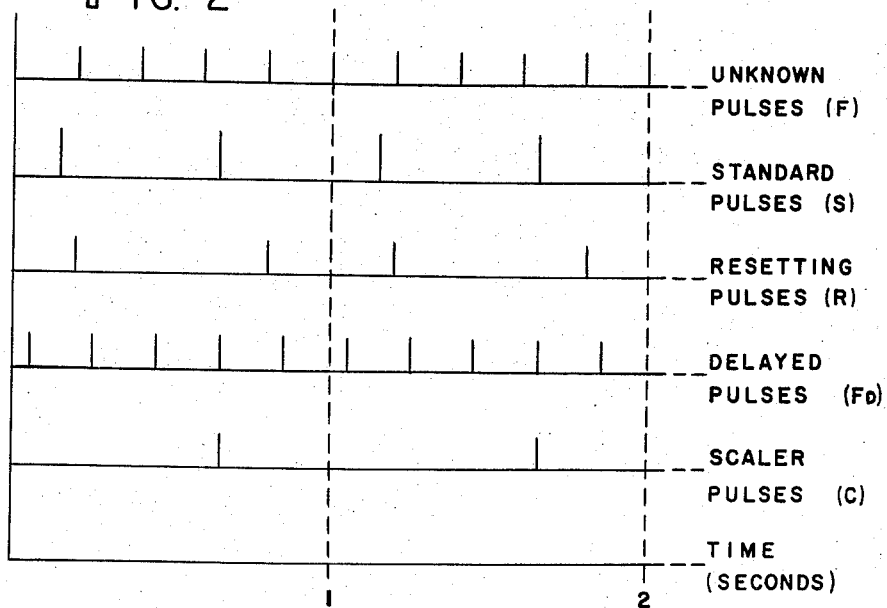
INVENTOR.
AN WANG Nov. 17, 1959  AN WANG  2,913,664
FREQUENCY METERS
Filed Jan. 11, 1955  2 Sheets-Sheet 2

INVENTOR.
AN WANG
BY Martin Kirkpatrick
Atty

United States Patent Office 2,913,664
Patented Nov. 17, 1959

2,913,664

FREQUENCY METERS

An Wang, Belmont, Mass.

Application January 11, 1955, Serial No. 481,192

4 Claims. (Cl. 324—78)

This invention relates to frequency meters for measuring the frequency of electrical impulses.

Frequency meters have been known in the art for many years, the type most commonly employed being based upon the use of a calibrated resonant circuit capable of being tuned to the frequency of the unknown signal to be measured. Although such circuits are basically quite simple, it has been found difficult to make them as accurate as might be desired in many applications, since their components, particularly their coils, are at best subject to physical changes due to temperature, humidity, vibration and the like which affect the calibration of the circuit. Furthermore, the accuracy of such circuits, particularly at high frequencies, leaves much to be desired.

Accordingly, it is an object of the present invention to provide a novel frequency meter capable of any degree of accuracy which may be desired, even to within a few cycles per second at relatively high frequencies.

Further objects and features of my invention will become apparent from the following detailed description of a preferred embodiment thereof, when taken in connection with the drawings, in which:

Fig. 1 is a block diagram of the frequency meter of the invention;

Fig. 2 is a graphical representation of the timing relationships achieved with the frequency meter of Fig. 1.

Figure 3:
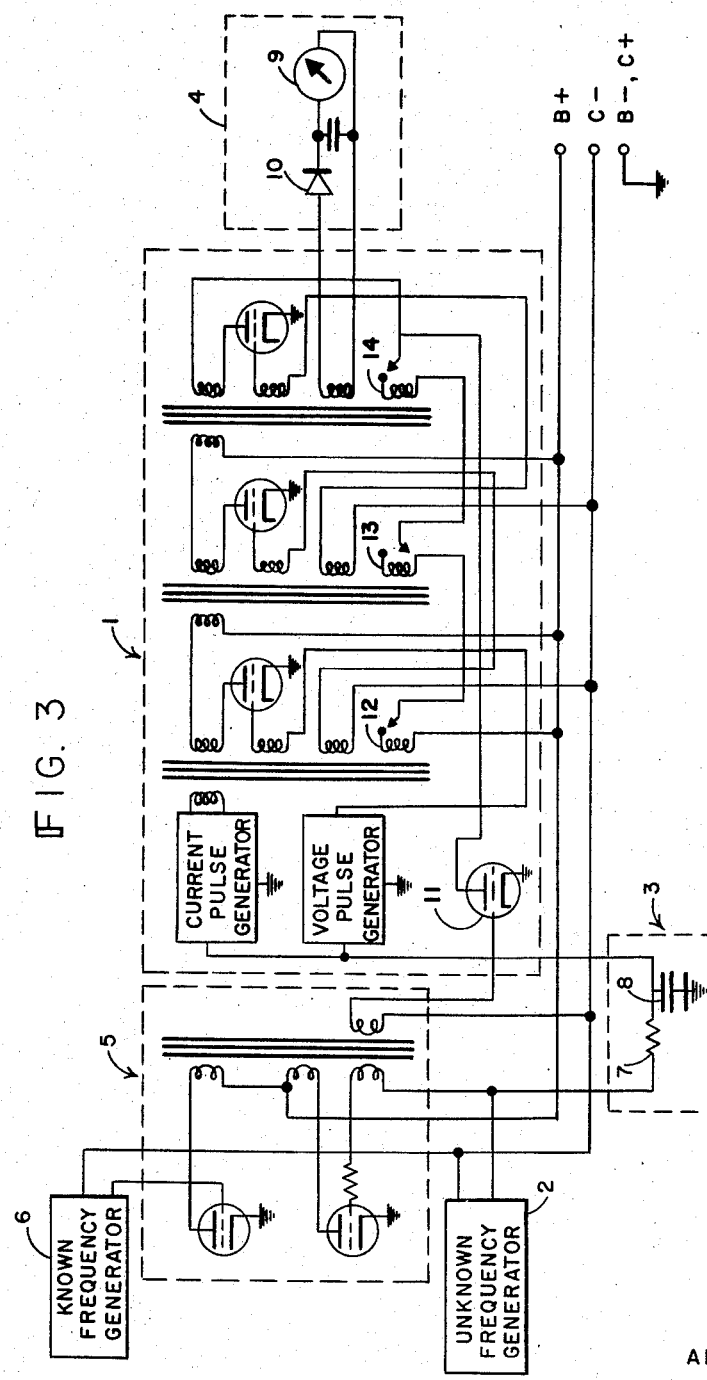
Fig. 3 is a circuit diagram of the frequency meter of Fig. 1.

Referring now to the drawings, and more particularly to Fig. 1 thereof, the novel frequency meter of my invention includes a scaler generally indicated at 1 for receiving signals of unknown frequency (F) from a generator 2, preferably through a time delay circuit 3 to provide delayed pulses ($F_D$), the relatively low frequency of the output pulses (C) of scaler 1 being measured by a suitable frequency meter generally indicated at 4. For resetting the scaler 1, a synchronizer generally indicated at 5 provides resetting pulses (R) having a predetermined relationship between the unknown frequency of signals (F) and the known frequency of signals (S) from a standard frequency generator 6. With such an arrangement, the frequency (F) to be measured is equal to $NS+C$, where $(N+1)$ is the scaler ratio and represents the frequency relationship between the scaler input pulses ($F_D$) and the scaler output pulses (C) without scaler reset, all as hereinafter explained.

It will be appreciated that each of the several elements of my novel frequency meter is itself well known in the art. For example, the generator 2 may comprise any source of signals of unknown frequency and the generator 6 for providing a signal of known frequency may be of any conventional type capable of providing an accurate reference frequency, such as a crystal controlled oscillator, for instance. Since the latter need only provide a relatively low frequency output at one or more fixed frequencies, such generator may readily be made accurate to within a cycle or two.

The synchronizer 5 is a device to which data pulses, as, for example in the form of a signal of known frequency (S), are applied together with timing pulses, as, for example in the form of a signal of unknown frequency (F). In operation, the synchronizer yields for each data pulse (S) an output pulse (R) occurring in time coincidence with a timing pulse (F). It is not necessary that a data pulse be applied for each timing pulse; many timing pulses may occur in an interval prior to the application of a data pulse, but when a data pulse is received, the synchronizer will deliver an output pulse in time coincidence with the next succeeding timing pulse. Such devices are well known in this art and may be of any one of a number of types.

The scaler 1 is likewise well known in the art, being a device which produces output pulses in predetermined ratio to input pulses supplied thereto by counting up to a predetermined number of said input pulses and then producing a single output pulse and automatically resetting to begin counting anew. The scaler is also provided with additional resetting means so that it may be reset at any desired time prior to the completion of its predetermined counting cycle without producing an output pulse. Preferably, the scaler should be of a type which may readily be adjusted to provide any one of a number of known scaling ratios.

In my present invention, advantage is taken of the above described synchronizer and scaler operation to provide a train of synchronizer output pulses (R) for resetting the scaler. Such output pulses have two alternating time intervals (Fig. 2). These time intervals can be considered as a first time interval equal to a time interval of $$\frac{N+1}{F}$$

and to a second time interval of $$\frac{N}{F}$$

where $$\frac{1}{F}$$

is the time interval between F pulses. Such synchronizer output pulses act as resetting pulses for scaler 1, which scaler is arranged to scale the somewhat delayed unknown pulses ($F_D$) at a ratio of $(N+1)$ so that an output pulse will be provided whenever a synchronizer output pulse occurs after a time interval of $$\frac{N+1}{F}$$

but not after a time interval of $$\frac{N}{F}$$

Thus, the frequency of the scaler output pulses (C) indicates the difference frequency between the unknown pulses (F) and the standard pulses (S) scaled by a factor of N, that is, $C=F-NS$ where the scaler ratio is $N+1$, N being the highest usable integral member, that is $$N \leq \frac{F}{S} \leq N+1$$

The frequency meter generally indicated at 4 for indicating the frequency of the scaler output pulses (C) may be any one of a number of known frequency meters capable of measuring relatively low frequencies preferably with an accuracy of a cycle or so. For example, mechanical meters such as vibrating reeds may be used, as well as any one of a number of electrical meters such as counters or integrating devices.

Referring now to Fig. 2, there is graphically illustrated the operation of the frequency meter of the invention wherein, as a simple example, an input of unknown pulses of 5 c.p.s. and known pulses of 2 c.p.s. is provided to the synchronizer 5. The output of the synchronizer, then, will provide resetting pulses (R) at an average frequency of 2 c.p.s. but at the time of the occurrence of the first input pulse (F) after a standard pulse (S) so that the interval between the resetting pulses (R) is not uniform but, rather, is dependent upon the time relationships between the input pulses (F) and the standard pulses (S). Thus, at the scaler 1 there will occur in between each resetting pulse (R) either two unknown pulses ($F_D$) or three unknown pulses ($F_D$). The scaler 1, being set at a predetermined scaling ratio of three as determined by the expression (N+1), the highest integral number usable for N being 2 in this case, will provide an output pulse (C) upon every third input pulse ($F_D$), but will provide no output pulse if the scaler be reset before the occurrence of a third signal. Thus, in this particular example, an output pulse (C) will be provided upon alternate synchronizer output resetting pulses (R) or at the rate of 1 c.p.s. as measured by frequency meter 4. This frequency relationship satisfies the above expressed formula wherein $F=5$, $N=2$, $S=2$, and $C=1$.

Referring now to Fig. 3, although various types of elements may be used in the novel frequency meter of my invention, I prefer that the synchronizer 5, the scaler 1, and the frequency meter 4 be of the types shown and described in my co-pending applications for Triggering Circuit, Serial No. 292,215, filed June 6, 1952, now Patent No. 2,772,357, and Magnetic Synchronizer, Serial No. 374,099, filed August 15, 1953, now Patent No. 2,769,163.

By the use of such elements employing magnetic components preferably of a ferrite (ferromagnetic ceramic) or of a magnetic material such as Deltamax characterized by a substantially rectangular hysteresis loop having two stable residual flux states, a relatively simple and reliable frequency meter according to this invention may be provided. Furthermore, particularly as to the synchronizer, such magnetic components make possible an extraordinarily simple circuit which will operate successfully to provide uniform output pulses irrespective of the wave form of the varying signal to be measured, or of the waveform of the known frequency signal provided by generator 6. The generator 6 is preferably an entirely conventional crystal controlled oscillator having one or more output frequencies, of say, 100 and 1000 kc., which frequencies can be selected in accordance with the frequency to be measured. The synchronizer as shown in Fig. 3 being fully described in said application Serial No. 374,099, and the scaler and frequency meter being fully described in said application Serial No. 292,215, will not herein be described in detail except to point out their interconnections with the various elements of the frequency meter of my present invention.

Accordingly, and as shown in Fig. 3, the unknown frequency generator 2 is connected through a time delay circuit 3 to the input of scaler 1, such time delay circuit preferably comprising a series resistor 7 and shunt capacitor 8 effective to delay the pulses to be counted for a short time interval not to exceed the time interval between said pulses.

The scaler 1 has a plurality of resetting coils 12, 13, and 14 to provide automatic resetting after a predetermined number of output pulses, switching means being provided for establishing such predetermined number (such switches herein shown as set to provide a scaler ratio of 3. Additionally, the scaler 1 may be reset by synchronizer 5, the output of said synchronizer being connected through a tube 11 in series with the scaler resetting coils 12, 13, and 14.

To provide a resetting pulse in accordance with this invention, the unknown frequency generator 2 and the known frequency generator 6 are each connected to the input of synchronizer 5 so that said synchronizer will produce an output pulse effective to reset the scaler upon the occurrence of each pulse of known frequency in time coincidence with a pulse of known frequency. Thus, the scaler will be reset alternately by the synchronizer and by itself (assuming the hereinabove discussed specific example) to provide scaler output pulses occurring at a rate of 1 c.p.s. The rate of such output pulses can then be determined by means of an ammeter 9 connected to said scaler through a diode 10, since the pulses themselves will be constant and can thus be integrated to give a direct reading of their frequency.

Various modifications of my novel frequency meter other than those herein shown and described but within the spirit of my invention and the scope of the appended claims will occur to those skilled in the art.

I claim:

1. A frequency meter for measuring the frequency of an input signal including scaler means for scaling said input signal to provide an output signal having a predetermined frequency relationship to said input signal and resetting means for said scaler means, said resetting means comprising signal generating means providing a signal of predetermined frequency and synchronizing means connected for one input to said signal generating means and for another input to said input signal providing an output signal for resetting said scaler, said synchronizing means output being connected to said scaler providing an output signal having a predetermined timing relationship between said input signal and said signal of predetermined frequency.

2. A frequency meter as claimed in claim 1, wherein the frequency of said input signal is equal to $NS+C$, where C is the frequency of the scaler output signal, S is the signal of predetermined frequency, and $N+1$ is the predetermined frequency relationship of said scaler output signal to said input signal.

3. A frequency meter as claimed in claim 1, further including means for measuring the frequency of said scaler output signal.

4. A frequency meter as claimed in claim 1, further including time delay means for delaying the arrival of said input signal to said scaler.

References Cited in the file of this patent

UNITED STATES PATENTS

| | | |
|---|---|---|
| 2,337,328 | Hathaway | Dec. 21, 1943 |
| 2,539,673 | Peterson | Jan. 30, 1951 |
| 2,677,104 | Chase | Apr. 27, 1954 |
| 2,735,066 | Corl | Feb. 14, 1956 |
| 2,743,419 | Chatterton | Apr. 24, 1956 |
| 2,761,968 | Kuder | Sept. 4, 1956 |
| 2,769,595 | Bagley | Nov. 6, 1956 |

FOREIGN PATENTS

| | | |
|---|---|---|
| 150,071 | Australia | July 13, 1950 |